(12) United States Patent
Soel et al.

(10) Patent No.: US 8,732,183 B2
(45) Date of Patent: May 20, 2014

(54) COMPARING STRINGS OF CHARACTERS

(75) Inventors: Shachar Soel, Kfar Sava (IL); Dmitry Gorenchteine, Vancouver (CA); Udi Cohen, Alfei Menashe (IL)

(73) Assignee: SAP Portals Israel Ltd, Ra'anana (IL)

( * ) Notice: Subject to any disclaimer, the term of this patent is extended or adjusted under 35 U.S.C. 154(b) by 106 days.

(21) Appl. No.: 13/482,514

(22) Filed: May 29, 2012

(65) Prior Publication Data

US 2013/0325884 A1 Dec. 5, 2013

(51) Int. Cl.
G06F 17/30 (2006.01)
(52) U.S. Cl.
USPC .......................................................... 707/758
(58) Field of Classification Search
CPC ............. G06F 17/30; G06F 17/30985; G06F 17/30386
USPC .......................................................... 707/758
See application file for complete search history.

(56) References Cited

U.S. PATENT DOCUMENTS

| 2009/0226098 | A1* | 9/2009 | Takahashi et al. | 382/218 |
| 2010/0023515 | A1* | 1/2010 | Marx | 707/6 |
| 2011/0167060 | A1* | 7/2011 | Merz et al. | 707/727 |
| 2012/0254211 | A1* | 10/2012 | Buchnik et al. | 707/758 |

OTHER PUBLICATIONS

"Trigram," en.wikipedia.org/wiki/Trigram, last visited on Apr. 5, 2012 (2 pages).
"Levenshtein Distance," en.wikipedia.org/wiki/Levenshtein_distance, last visited on Mar. 19, 2012 (6 pages).

* cited by examiner

*Primary Examiner* — Joshua Bullock
(74) *Attorney, Agent, or Firm* — Fish & Richardson P.C.

(57) ABSTRACT

Techniques for comparing character strings include identifying a first character string having a first string length, and a second character string having a second string length greater than the first string length; parsing the first character string into one or more first sub-groups of characters; parsing the second character string into one or more second sub-groups of characters; comparing each of the one or more first sub-groups of characters against the one or more second sub-groups of characters; determining a ratio of a number of characters in the one or more first sub-groups of characters that match the one or more second sub-groups of characters and the second string length; and based on the ratio being greater or equal to a threshold, preparing at least one of the first or second character strings for display, the threshold including a variable value based on the first string length.

24 Claims, 6 Drawing Sheets

FIG. 6

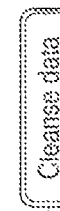

Specify source of data — 602

Data uploaded — 604

610 — Cleanse data

REFINE EXAMPLE [CHANGE SOURCE]

| col1 | col2 | col3 |
|---|---|---|
| John Smith | USA | Dept of defense |
| Mr. John Smith | United States of America | Department of defense |
| Smith John | The United States of America | DOD |
| Michael Jones | Isreal | Highway |
| Mike Jones | Isreal | Hwy |
| Sargent | French Republic | TTYL |
| sgt | Republic of France | Talk to you later |

Showing 7 rows of 11 — 606c

608 — Next 606a, 606b

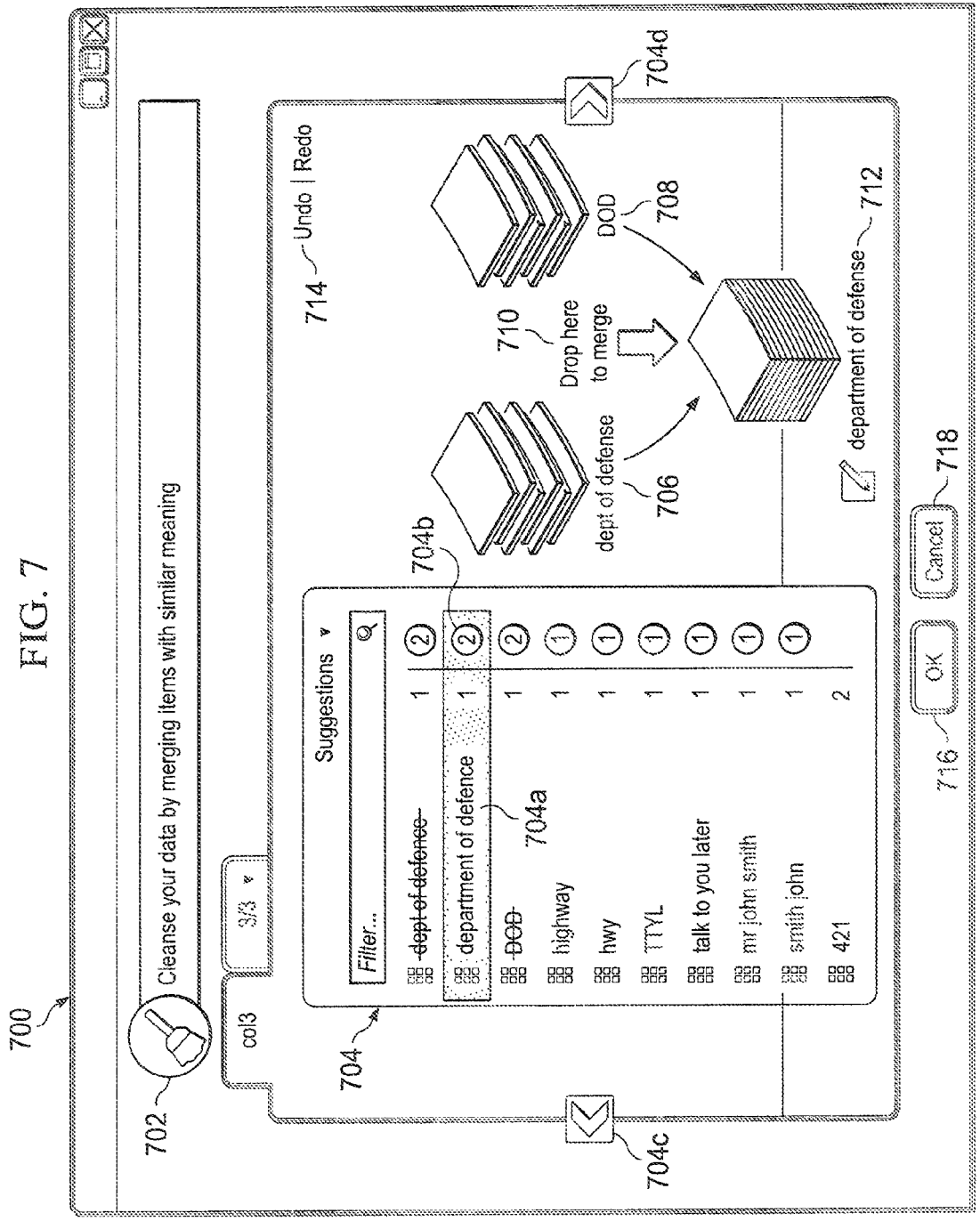

COMPARING STRINGS OF CHARACTERS

TECHNICAL BACKGROUND

This disclosure relates to comparing strings of characters and, more particularly, comparing strings of characters with one or more string matching algorithms.

BACKGROUND

Although data can be stored and processed in various ways, text remains the main form to exchange information. This is particularly evident in literature or linguistics where databases are composed of huge libraries. This applies as well to computer science where a large amount of data is stored in linear files. And this is also the case, for instance, in various business environments, such as supply chains, where lists of items and other corresponding information are processed and stored in various locations. Furthermore the quantity of stored data in these fields tends to increase over time.

Often, new data is added to the database through manual typing. Manually typed data, in particular spreadsheets, typically contain human errors or inconsistencies. For example the user might produce spelling errors, use different syntaxes to describe the same item ("long-established" and "long established"), or sometimes use acronyms. The occurrence of human errors and inconsistencies is a problem when attempting to upload such data into a database.

SUMMARY

This specification describes systems, methods, apparatus, and computer-readable media for string matching algorithms. In particular, embodiments include an interactive identification of character strings. In some embodiments, character strings are matched by using a sequence of multiple string matching algorithms. In some instances, character strings may be matched according to an abbreviation matching algorithm, a string matching algorithm using trigrams, and/or a string matching algorithm using edit distance.

One or more general embodiments for comparing character strings include identifying a first character string having a first string length, and a second character string having a second string length greater than the first string length; parsing the first character string into one or more first sub-groups of characters; parsing the second character string into one or more second sub-groups of characters; comparing each of the one or more first sub-groups of characters against the one or more second sub-groups of characters; determining a ratio of a number of characters in the one or more first sub-groups of characters that match the one or more second sub-groups of characters and the second string length; and based on the ratio being greater or equal to a threshold, preparing at least one of the first or second character strings for display, the threshold including a variable value based on the first string length.

A first aspect combinable with any of the general embodiments includes, based on the ratio being less than the threshold, matching the first character string to at least a first sub-group of the one or more second sub-groups of characters of the second character string; and based on a ratio of first string length and the second string length that is greater or equal to the threshold, preparing at least one of the first or second character strings for display.

A second aspect combinable with any of the previous aspects includes, based on the ratio being less than the threshold, matching a first sub-group of the first character string with a first sub-group of the second character string; matching a last sub-group of the first character string with a last sub-group of the second character string; and based on a ratio of a combined length of the first and last sub-groups of the first character string and the second string length that is greater or equal to the threshold, preparing at least one of the first or second character strings for display.

A third aspect combinable with any of the previous aspects includes, based on the ratio being less than the threshold, determining that the characters of the first character string match first characters of at least a subset of the one or more second sub-groups of characters; determining a number of matched characters being equal to a sum of a number of characters in the subset of the one or more second sub-groups of characters; determining a number of unmatched characters being equal to the second string length minus the number of matched characters; and based on a ratio of the number of matched characters and the number of unmatched characters that is greater or equal to the threshold, preparing at least one of the first or second character strings for display.

A fourth aspect combinable with any of the previous aspects includes, based on the ratio being less than the threshold, parsing the first character string into one or more first groups of trigrams, each of the first groups of trigrams including three characters of the first character string; parsing the second character string into one or more second groups of trigrams, each of the second groups of trigrams including three characters of the second character string; determining a number of trigram matches between the one or more first groups of trigrams and the one or more second groups of trigrams; and based on a ratio of the number of trigram matches and a sum of the first and second groups of trigrams that is greater or equal to the threshold, preparing at least one of the first or second character strings for display.

A fifth aspect combinable with any of the previous aspects includes, based on the ratio of the number of trigram matches and a sum of the first and second groups of trigrams being less than the threshold, determining an edit distance value between the first character string and the second character string, the edit distance including a number of edits to the first character string so that the first character string matches the second character string; determining a similarity of the first and second character strings based on a ratio of the edit distance of the first string distance; and based on the similarity being greater or equal to the threshold, preparing at least one of the first or second character strings for display.

A sixth aspect combinable with any of the previous aspects includes determining the variable value based on the first string length, a upper limit of the threshold, a lower limit of the threshold, and a growth rate of the threshold.

A seventh aspect combinable with any of the previous aspects includes, determining the variable value includes determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and determining the variable value based on a value equal to 1 minus a ratio of the complement and the first string length.

Various embodiments of a string matching engine according to the present disclosure may have one or more of the following features. For example, the present disclosure includes the combination of multiple string matching methods for performance optimization and a dynamic threshold function to deal with short and long strings. As another example, the string matching engine may provide for more a more accurate string matching process due to, for instance, each of the multiple string matching methods being designed for a particular type of string match, e.g., misspellings, acronyms, prefixes, and otherwise.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more embodiments are set forth in the accompanying drawings and the description below. Other features, objects, and advantages will be apparent from the description and drawings, and from the claims.

DESCRIPTION OF DRAWINGS

FIG. 6 is a schematic illustration of an example graphical user interface of a system for matching one or more strings of characters.

FIG. 7 is a schematic illustration of another example graphical user interface of a system for matching one or more strings of characters.

DETAILED DESCRIPTION

This specification describes systems, methods, apparatus, and computer-readable media for string matching algorithms. In particular, embodiments include an interactive identification of character strings. In some embodiments, character strings are matched by using a sequence of multiple string matching algorithms. In some instances, character strings may be matched according to an abbreviation matching algorithm, a string matching algorithm using trigrams, and/or a string matching algorithm using edit distance.

In some embodiments a threshold value can be used to limit the search of matching character strings. In some embodiments, the threshold can be a simple real number between 0-1, e.g., inclusive. In some embodiments, the system can generate a threshold based on the length of the character string. For instance, the system may generate higher thresholds for longer character strings and vice versa.

In some embodiments, the client could be interested in the similarity of strings if it is above the threshold. Any similarity under the set threshold may be regarded as zero similarity, e.g., dissimilar. In some embodiments, the user can select or modify the threshold to set, to increase, or to decrease the number of identified character string matches. For example, the similarity rating of two character strings can be defined as the maximum similarity identified by any string matching algorithm included in a sequence of multiple string matching algorithms, with which the pair of character strings was analyzed.

In some embodiments, the user can be interested in the match and similarity ratings between all the members of a set of character strings within a file. In this case the output includes for each item in the set the following information: a list of items (character strings) similar to the item and their level of similarity. In some embodiments the level of similarity could be displayed quantitatively, e.g., in percentage, or qualitatively, e.g., best match, good match.

Figure 1:
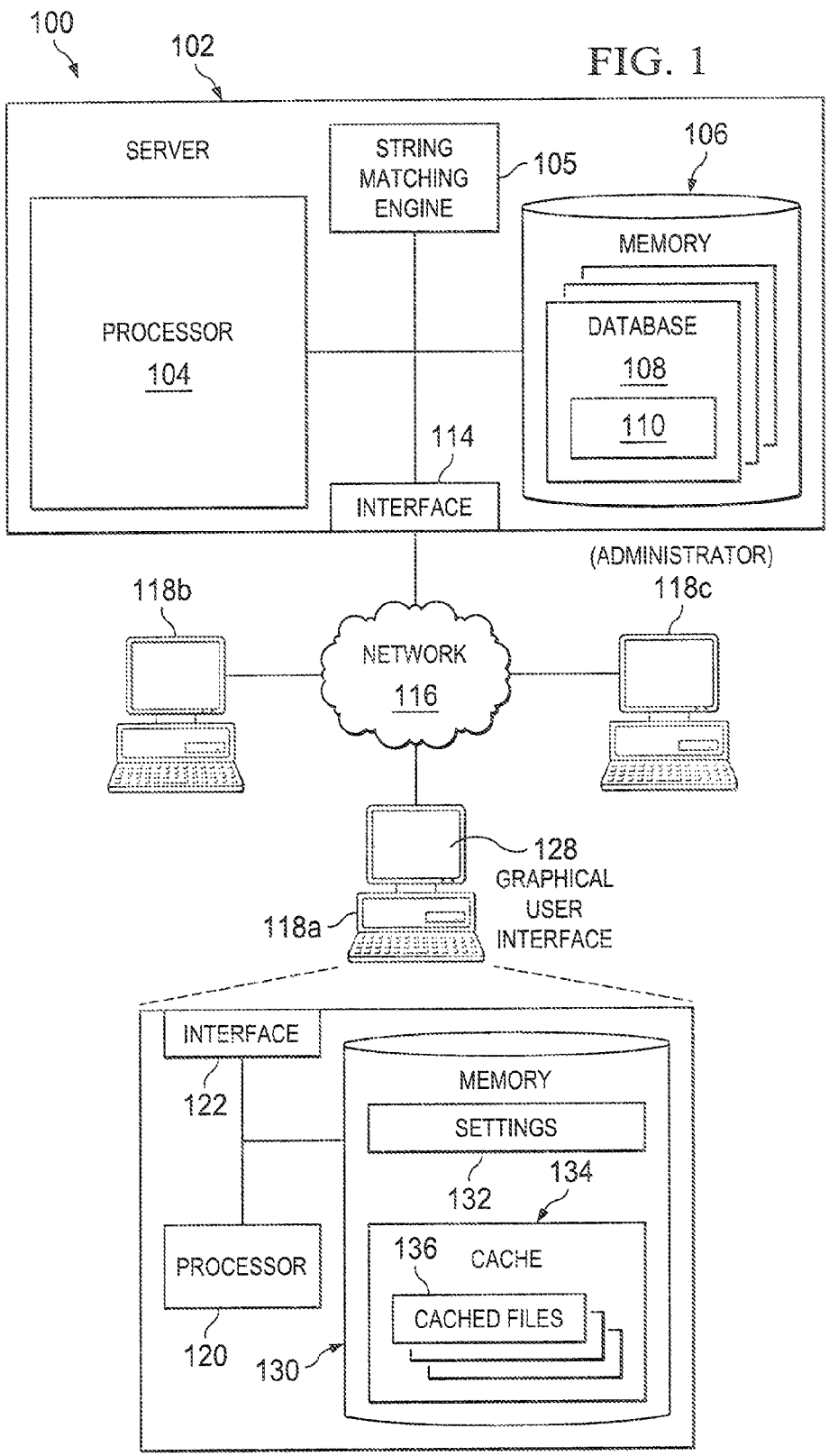
FIG. 1 illustrates an example distributed computing system operable to match one or more strings of characters.

FIG. 1 illustrates an example environment 100 for string matching, which includes or is communicably coupled with server 102 and one or more clients 118 (although only one client is illustrated in FIG. 1, a plurality of clients 118 may be included in environment 100), at least some of which communicate across network 116. In general, environment 100 depicts an example configuration of a distributed computing environment, e.g., a client-server environment. However, computing environments other than or in addition to that illustrated in FIG. 1, e.g., stand-alone computing systems, dedicated computers or processors, cloud computing environments, and otherwise, may be utilized without departing from the scope of the present disclosure.

In general, server 102 is any server that includes or is communicably coupled with a database 108 that stores one or more data objects 110 where at least a portion of the data objects 110 can be communicated or transmitted to users or clients within and communicably coupled to the illustrated environment 100 of FIG. 1. In some instances, server 102 may dynamically generate or update data objects 110 "on the fly," or when requests for those data objects 110 are received. At a high level, the server 102 includes an electronic computing device operable to receive, transmit, process, store, or manage data and information associated with the environment 100. It will be understood that the term "server" can include any suitable component or module for providing or serving networked pages, such as networked business applications. Specifically, the server 102 illustrated in FIG. 1 is responsible for receiving requests from the client 118 for one or more data objects 110 stored at the server 102 and responding to the received requests by serving, or sending, the requested data objects 110 to the requesting client 118 via the network 116.

In addition to the client 118 illustrated in FIG. 1, file requests may also be sent from internal users, external or third party customers, and automated applications, as well as other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers others than servers, including a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Illustrated server 102 may be adapted to execute any operating system including Linux, UNIX, Windows Server, or any other suitable operating system.

In the present embodiment, and as shown in FIG. 1, the server 102 includes an interface 114, a processor 104, a memory 106, and a string matching engine 105. The interface 114 is used by the server 102 for communicating with other systems in a client-server or other distributed environment (including within environment 100) connected to the network 116, e.g., client 118, as well as other systems communicably coupled to the network 116. Generally, the interface 114 includes logic encoded in software and/or hardware in a suitable combination and operable to communicate with the network 116. More specifically, the interface 114 may comprise software supporting one or more communication protocols associated with communications such that the network 116 or hardware is operable to communicate physical signals within and outside of the illustrated environment 100.

Generally, the network 116 facilitates wireless or wireline communications between the components of the environment 100, e.g., between the server 102 and client 118, as well as with any other local or remote computer, such as additional clients, servers, or other devices communicably coupled to network 116 but not illustrated in FIG. 1. The network 116 is illustrated as a single network in FIG. 1, but may be a continuous or discontinuous network without departing from the scope of this disclosure, so long as at least a portion of the network 114 may facilitate communications between senders and recipients. The network 114 may be all or a portion of an enterprise or secured network, while in another instance at least a portion of the network 114 may represent a connection to the Internet. In some instances, a portion of the network 114 may be a virtual private network (VPN), such as, for example, the connection between the client 118 and the server 102. Further, all or a portion of the network 114 can include either a wireline or wireless link. Example wireless links may include 802.11 a/b/g/n, 802.20, WiMax, and/or any other appropriate wireless link. In other words, the network 114 encompasses any internal or external network, networks, sub-network, or combination thereof operable to facilitate communications between various computing components inside and outside the illustrated environment 100. The network 114 may communicate, for example, Internet Protocol (IP) packets, Frame Relay frames, Asynchronous Transfer Mode (ATM) cells, voice, video, data, and other suitable information between network addresses. The network 114 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 104. Although illustrated as a single processor 104 in FIG. 1, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component. Generally, the processor 104 executes instructions and manipulates data to perform the operations of server 102, often using software. Specifically, the server's processor 104 executes the functionality required to receive and respond to requests from the client 118, as well as the functionality required to update and store information associated with the plurality of data objects 110 within memory 106. Regardless of the particular embodiment, "software" may include computer-readable instructions, firmware, wired or programmed hardware, or any combination thereof on a tangible medium as appropriate. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The server 102 also includes memory 106. Memory 106 may include any memory or database module and may take the form of volatile or non-volatile memory including, without limitation, magnetic media, optical media, random access memory (RAM), read-only memory (ROM), removable media, or any other suitable local or remote memory component. Memory 106 may store various objects or data, including classes, frameworks, applications, backup data, business objects, jobs, files, file templates, database tables, repositories storing business or other dynamic information, or any other information including any parameters, variables, algorithms, instructions, rules, constraints, or references thereto relevant to the purposes of the server 102. Additionally, memory 106 may include any other appropriate data, such as VPN applications, firmware logs and policies, firewall policies, a security or access log, print or other reporting files, as well as others.

Specifically, illustrated memory 106 includes a plurality of data objects 110 (where at least some of the data objects 110 include one or more text data objects 110). Although illustrated within memory 106, some or all of the illustrated elements may be located or stored outside of memory 106 and/or server 102, e.g., in multiple different memories and/or on multiple different servers, as well in other locations external to, but communicably coupled with, environment 100. For example, some or all of the data objects 110 may be stored remotely from server 102, and accessed separately by the client's browser 128 based on the file reference 110 received with the particular requested database 108 served by the server 102. Each data object 110 may be stored as a spreadsheet file, e.g., Microsoft Excel®, a text file, an HTML document, an eXtensible Hypertext Markup Language (XHTML) document, an XML document, or any other suitable file type that can be processed and used by a client 118 to provide a visual representation of the character strings defined by the associated file 108. In many situations, the data object 110 may include various programming languages or text implementing various formats and functions. In other words, each data object 110 may include any number of references to cacheable information and such reference may be direct or indirect as appropriate.

In addition to static content defined by the data object 110 each database 108 may include, embed, or be associated with additional dynamic content, as well as other content stored apart from the database 108 itself, wherein the associated content is defined as embedded within, or a part of, the file file's 108 source code. In those instances, in addition to the database 108 itself, additional information or data is retrieved by the client 118 in order to provide a complete visual representation of the file associated with the file 108.

In addition to the location of the data object 110, each file reference 110 may, in some embodiments, include an additional parameter that uniquely defines the current version of the associated character strings stored at the referenced location. For example, an additional parameter uniquely identifying the stored strings within the data object 110 may be a "last modified" attribute of the data object 110, defining when the data object 110 was last updated or modified. In those instances, the parameter may be defined by the date, and, in some cases, the exact time, of the last data object 110 modification. Alternatively, the unique identifier may be randomly assigned each time the data object 110 is updated or modified, such as by using a random number generator or random system entropy data collected at the time of the update or modification. In still other instances, the unique identifier or parameter may be represented as the file name of the data object 110, while in other instances, the particular version number of the data object 110 may be used. Additionally, a combination of some or all of these unique identifiers, as well as others, may be used or combined to create the unique identifier for the file reference 110.

As illustrated in FIG. 1, the server 102 may include a string matching engine 105 for managing the data objects 110 included within each database 108. The string matching engine 105 may be executed by processor 104, and may include any software application or module capable of monitoring the set of data objects 110 for updates or modifications to one or more of the data objects 110 stored therein. In one instance, the string matching engine 105 determines when a particular data object 110 is modified, e.g., in relation to the string matching algorithm, and inserts or replaces the appropriate string within the data object 110.

In other instances, the string matching engine 105 may work in connection with the server 102 to generate the unique parameters for the one or more data objects 110 "on the fly," or when the database 108 associated with or embedding the data object 110 is requested by a client 118 or web browser. In these instances, some or all data objects 110 will be dynamically generated only upon request from a client 118, web browser, or another component or entity. In those instances, no stored database 108 will need to be updated at the server 102 when data objects 110 are modified. Instead, the server 102 and string matching engine 105 will dynamically generate both the new database 108 and the new file reference 110 associated with the file request and updated data object 110.

The illustrated environment of FIG. 1 also includes one or more clients 118. Each client 118 is any computing device operable to connect or communicate at least with the server 102 and/or the network 116 using a wireline or wireless connection. Further, each client 118 includes a processor 120, an interface 122, a graphical user interface (GUI) 128, and a memory 130. In general, the client 118 comprises an electronic computing device operable to receive, transmit, process, and store any appropriate data associated with the environment 100 of FIG. 1. It will be understood that there may be any number of clients 118 associated with environment 100, as well as any number of clients 118 external to environment 100. For example, while illustrated environment 100 of FIG. 1 includes three clients (118a, 118b, and 118c), alternative embodiments of environment 100 may include a single client 118 communicably coupled to the server 102, while other embodiments may include more than the three clients 118. There may also be one or more additional clients 118 external to the illustrated portion of environment 100 that are capable of interacting with the environment 100 via the network 116. Further, the term "client" and "user" may be used interchangeably as appropriate without departing from the scope of this disclosure. Moreover, while each client 118 is described in terms of being used by one user, this disclosure contemplates that many users may use one computer or that one user may use multiple computers.

As used in this disclosure, client 118 is intended to encompass a personal computer, touch screen terminal, workstation, network computer, kiosk, wireless data port, smart phone, personal data assistant (PDA), one or more processors within these or other devices, or any other suitable processing device. For example, each client 118 may comprise a computer that includes an input device, such as a keypad, touch screen, mouse, or other device that can accept information, and an output device that conveys information associated with the operation of the server 102 or the client 118, including digital data, visual information, or the GUI 128. Both the input device and the output device may include fixed or removable storage media such as a magnetic computer disk, CD-ROM, or other suitable media to both receive input from and provide output to users of the clients 118 through the display, namely the GUI 128. As indicated in FIG. 1, client 118c is specifically associated with an administrator of the illustrated environment 100. The administrator associated with client 118c can modify various settings associated with one or more of the other clients 118 (including one or more browser settings 132 associated with each client 118), server 102, and/or any suitable portion of environment 100. For example, the administrator of client 118c may be able to modify the cache timeout values associated with web browsers within each of the clients 118, as well as any settings associated with the string matching engine 105, such as the format and style of the parameters generated to uniquely identify the various data objects 110 stored at the server 102.

The interface 122 of each client 118 may be similar to interface 114 of the server 102 in that it may comprise logic encoded in software and/or hardware in a suitable combination and operable to communicate with the network 116. More specifically, interface 122 may comprise software supporting one or more communication protocols such that the network 116 or hardware is operable to communicate physical signals to and from the client 118.

Similarly, memory 130 of each client 118 may be similar to memory 106 of the server 102, and may include any memory or database module and take the form of volatile or non-volatile memory including, without limitation, magnetic media, optical media, random access memory (RAM), read-only memory (ROM), removable media, or any other suitable local or remote memory component. For example, memory 130 may store backup data, parameters, cookies, variables, algorithms, instructions, rules, or references thereto, as well as any other suitable data. As illustrated, memory 130 includes a set of browser settings 132, a web cache 134, and an file cache 136, each of which will be described below.

The GUI 128 comprises a graphical user interface operable to allow the user to interface with at least a portion of environment 100 for any suitable purpose, including generating a visual representation of the one or more data objects 110 received by the client 118 from the server 102, as well as to allow users at each client 118 to view those visual representations. Generally, the GUI 128 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 128 can be any graphical user interface, such as a web browser, touch screen, or command line interface (CLI) that processes information in the environment 100 and efficiently presents the results to the user. In general, the GUI 128 may include a plurality of user interface (UI) elements such as interactive fields, pull-down lists, and buttons operable by the user at the client 118. These UI elements may be related to the functions of one or more applications executing at the client 118, such as a business application or the web browser associated with the GUI 128. In particular, the GUI 128 may be used in connection with the web browser associated with the GUI 128 to view and navigate to various files, some of which may be associated with (or the visual representation of) the data objects 110 stored in and associated with the server 102 (as illustrated in FIG. 1).

In some instances, the GUI 128 may be all or a portion of a software application, which enables the client 118 (or a user thereof) to display and interact with various types of documents which include strings and are typically located in files received from one or more servers, e.g., data objects 110 on server 102, or other computers accessible via the network 116. The strings embedded within files can be grouped and displayed through GUI 128 to enable execution of one or more string matching algorithms, with the string matching engine 105. Users of client 118 can also view output associated with string matches that exceed a similarity threshold, e.g., are similar enough, using the GUI 128. In general, the GUI 128 may display, for instance, all or part of the data objects 110, as well as one or more user interfaces, such as the example user interfaces shown in FIGS. 6-7. As illustrated in FIG. 1, the GUI 128 can connect to the server 102 via the network 116. In certain embodiments, the GUI 128 may be associated with, or may be a portion or module of, a business application, providing web browser or similar file processing and visualization functionality to the application.

Further, when the GUI 128 sends a second, later request for the same file to the server 102, the server 102 again sends a copy of the associated data object 110 to the GUI 128. After this request, however, some or the entire data object 110 may be cached at the client 118 such that additional server requests for the embedded, cacheable elements of the database 108 may not be necessary.

While FIG. 1 is described as containing or being associated with a plurality of components, not all components illustrated within the example embodiment of FIG. 1 may be utilized in each alternative embodiment of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes in addition to those purposes described herein.

Figure 2:
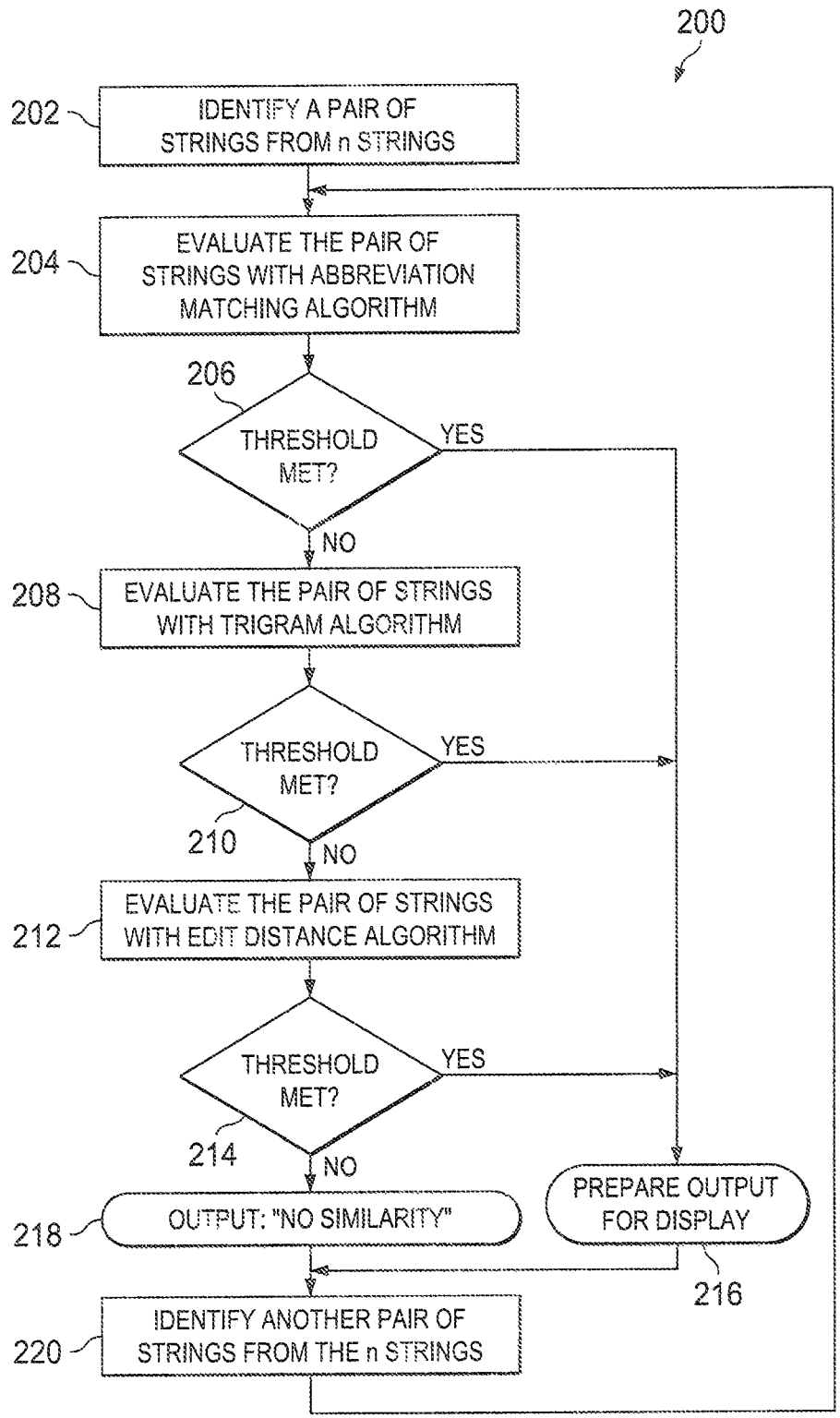
FIG. 2 is a flowchart depicting an example method for matching one or more pairs of strings of characters.

FIG. 2 illustrates a flowchart depicting an example method 200 that can be executed in accordance with embodiments of the present disclosure. In some embodiments, the example method 200 can include operations that are performed by one or more clients such as the string matching engine 105 in FIG. 1 executed using one or more data processing apparatus, e.g., one or more client-side computing devices and/or one or more server-side computing devices. In some embodiments, the method used to identify similar strings can include multiple string matching algorithms.

In step 202, a pair of strings, e.g., from a number, n, strings, is identified. For instance, a client can select a data object 110 from database 108 via a GUI 128 (illustrated in FIG. 1) to retrieve multiple strings. As another example, a data object, such as a spreadsheet file, a .csv file, or other text file which stores discrete strings of characters, e.g., separated by commas, semicolons, return carriages, or otherwise, can be uploaded or otherwise retrieved from a remote location, a database, or other location. In still further embodiments, method 200 may be performed on one or more pairs of strings in a data object 108 and, after execution of the method 200, the identified similar strings may be uploaded, e.g., to the database 108.

In some instances, the client may not always want the exact similarity between each pair of strings, rather the client may only be interested in the character string matches that exceed a particular threshold, e.g., are similar enough. In some embodiments, to achieve this, multiple string matching algorithms may be executed in a sequence. For example, the order of the execution of string matching algorithms can be selected according to the computation speed of each string matching algorithm.

In step 204, character strings are evaluated according to an abbreviation matching algorithm. For example, in some embodiments, the string matching engine 105 illustrated in FIG. 1 may perform the abbreviation matching algorithm to evaluate the pair of character strings. In step 206, a determination is made whether a threshold similarity value is met, e.g., a variable threshold between 0 and 1. If the threshold is met, e.g., the calculated similarity value from the abbreviation matching algorithm is greater than the threshold, then an output is prepared for display in step 216. In some embodiments, for example, the output prepared for display may be the pair of strings that have been determined, according to the abbreviation matching algorithm, to "match," e.g., identical or similar enough.

If the threshold is not met in step 206, then the pair of character strings are evaluated according to a trigram algorithm in step 208. If the threshold is met in step 210, e.g., the calculated similarity value from the trigram algorithm is greater than the threshold, then an output, as above, is prepared for display in step 216.

If the threshold is not met in step 208, then the pair of character strings are evaluated according to a trigram algorithm in step 212. If the threshold is met in step 214, e.g., the calculated similarity value from the edit distance algorithm is greater than the threshold, then an output, as above, is prepared for display in step 216.

In step 218, another pair of strings from the n strings is identified, and method 200 may return to step 204 for evaluation of the other pair of strings. For example, method 200 may iterate a number of times according to how many unique pairs of strings are within the n strings. For example, in n strings consisting of strings A, B, C, D, a unique pair of strings may consist of A-B/B-A, A-C/C-A, A-D/D-A, B-C/C-B, B-D/D-B, and C-D/D-C. In other words, by using symmetric relations, there may be no need to match strings "B" to "A" when strings "A" to "B" have already been matched.

As one example optimization, if a particular string A has already been matched to a number, X, similar strings, then string A may not be attempted to be matched to any other string, thereby facilitating a more efficient string matching process. For example, if X=25 and the string A has already been matched to other strings $B_1 \ldots B_{25}$, then the string matching process described herein may not attempt to match string A to string C. However, if the string matching process described herein is attempting to match string C to similar strings, and X<25 for matches for string C, then the process may attempt to match string C with string A. In some instances, such an optimization may help ensure that a user may not be overflooded with information (e.g., similar strings) in a GUI. Further, by skipping some steps of the string matching process, overall processing time may be reduced.

In some embodiments, the different string matching algorithms shown in steps 204, 208, and 212 may be performed in a different order. For example, the pair of strings may first be evaluated according to the edit distance algorithm shown in step 212. In addition, in some embodiments, there may be less than three string matching algorithms used to evaluate the pair of strings in method 200. Alternatively, there may be more than three string matching algorithms used to evaluate the pair of strings in method 200.

Figure 3:
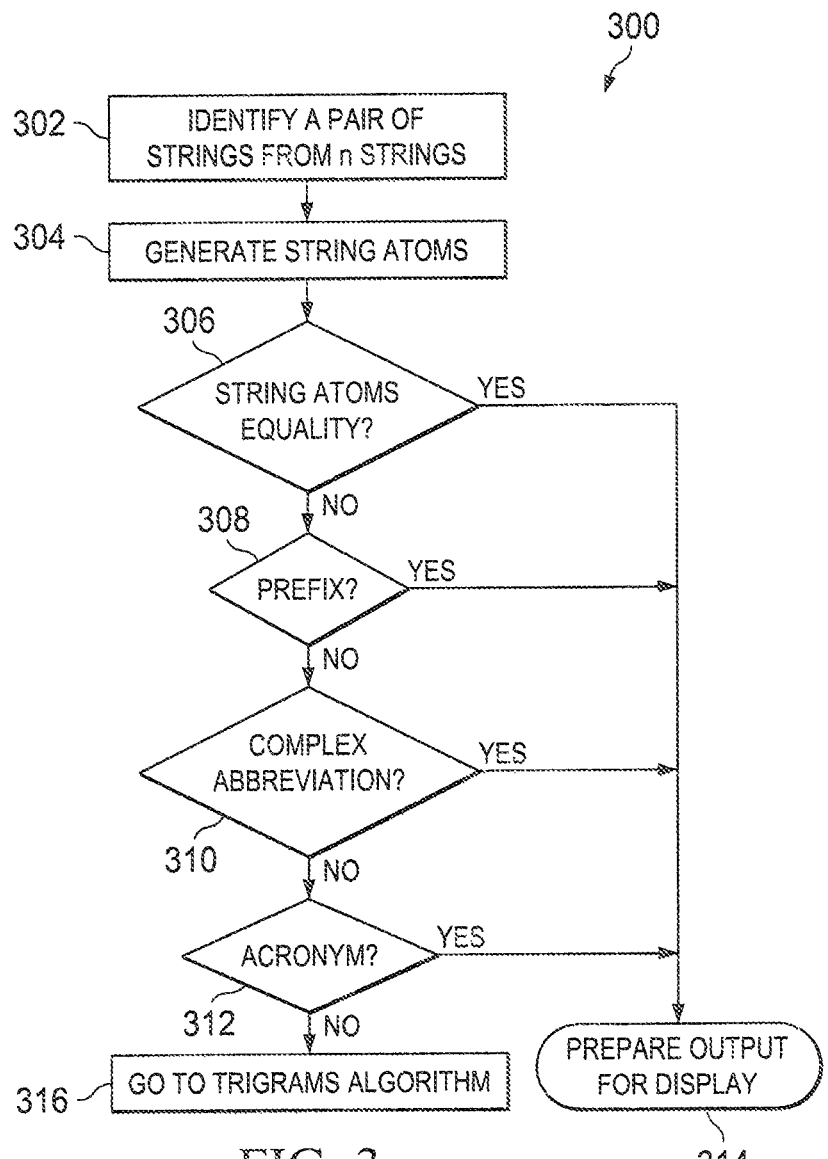
FIG. 3 is a flowchart depicting another example method for matching one or more pairs of strings of characters that can be executed in accordance with embodiments of the present disclosure.

FIG. 3 illustrates a flowchart depicting an example method 300 that can be executed in accordance with embodiments of the present disclosure. In some embodiments, the similarity of character strings can be evaluated using an abbreviation matching algorithm in method 300, using the steps illustrated in FIG. 3. An abbreviation matching algorithm can identify a shortened form of a word or a phrase, e.g., an acronym, a prefix, an abbreviation, or otherwise. For example the abbreviation matching algorithm can identify the similarity between "USA" and "United States of America", "Sgt" and "sergeant", or other type of abbreviations.

Method 300 may begin at step 302, when a pair of strings of n character strings are identified, e.g., from data objects 110. In step 304, each of the character strings of the pair are divided into atoms, e.g., a part of a sentence, a single word, or a number, or a sign delimited by space. For example the character string, "United States of America," would be divided by the abbreviation matching algorithm 300 in four different atoms, corresponding to each word of the string. The character string, "USA," would be represented as a single atom.

According to some embodiments, the abbreviation matching algorithm compares pairs of character strings (divided in atoms) by attempting to match atoms from a smaller list of atoms (SMALL) to atoms or part of atoms from a bigger list of atoms (BIG). The order of matching corresponds to the order of the atoms in the list (array). In some embodiments, matching can be done in a "greedy" manner, which results in linear time complexity. For example, matching by the abbreviation matching algorithm may include comparing atoms according to one or more rules. If the pair of character strings "match", e.g., identical or similar enough according to a particular rule, then the method may stop without continuing the evaluation under any additional rules, even if another rule would yield a stronger "match", e.g., indicate that the pair of character strings is more similar than the previous rule.

In some embodiments, the similarity of a pair of character strings is proportional to the total length of the atoms from BIG, which were matched to atoms in SMALL and inversely proportional to the total length of all the atoms in BIG. According to some embodiments, all atoms in SMALL must be successfully matched against atoms in LARGE. Failure to match all the atoms from SMALL may mean that the two character strings are not similar (similarity of 0). For example, if the character string SMALL is {USA} and the character string BIG is {United, States, Of, America}, which has a total length equal to 21, the length of unmatched atoms from BIG will be 2 (corresponding to the preposition "of"), and therefore the similarity in this case is (21−2)/21=~0.904.

In some embodiments, the method 300 can match the atoms in SMALL and BIG according to a set of rules. For example, in step 306, the method 300 evaluates character string equality, e.g., whether atom SMALL[s]==atom BIG[b]. If the character strings are similar, e.g., a similarity threshold is met in step 306, then the similarity output is prepared for display in step 314. If the character strings are not similar, e.g., a similarity threshold is not met in step 306, the abbreviation matching algorithm 300 goes to the next rule.

In step 308, the pair of atoms is evaluated to determine if SMALL[s] is shorter than BIG[b] and SMALL[s] is a prefix of BIG[b]. If SMALL[s] is a prefix of BIG[b] in step 308, then the similarity output is prepared for display in step 314. If the prefix rule in step 308 is not satisfied, the method 300 may continue to the next abbreviation matching rule.

In step 310, the pair of strings is evaluated to determine if SMALL[s] is shorter than BIG[b] and SMALL[s] is a complex abbreviation of BIG[b]. According to some embodiments, a complex abbreviation can be an abbreviation made up of a prefix, and suffix and optionally a "middle" part. For example, the character string "dept" can be a complex abbreviation for the character string "department." If the character string pair fulfills the complex abbreviation rule in step 310, then the similarity output is prepared for display in step 314. Conversely, if SMALL is not a complex abbreviation of BIG, the method 300 may continue to the next rule.

In step 312, the pair of atoms is evaluated to determine if SMALL[s] is an acronym for a character string with a different number of atoms BIG[t]. For example, the character string SMALL can be composed of a single atom "US", which is an acronym for a character string BIG with two atoms: "United" and "States. If the character string SMALL is identified as being an acronym for BIG in step 312, then the similarity output is prepared for display in step 314. Otherwise, the character string pair may be evaluated according to another string matching algorithm.

In some embodiments, the indices s and b are the positions in the array of atoms in SMALL and the array of atoms in BIG, respectively. When method 300 is implemented, both s and b indices may be set to 1. Once a matching condition has been detected, the indices will be increased. If no matching condition has been detected, however, than only the index, b, of BIG may be increased by 1 (thereby also increasing the number of mismatches). In the case of the first three rules, e.g., steps 306, 308 and 310 both s and b indices may be increased by 1. In the case of the acronym rule at step 312, s may be increased by 1 and b may be increased by t−s. Thus, the index of b may be the index of the first atom after the most recent atom matched from BIG. After each such increment, the value of s and b indicates the next pair of atoms to compare according to the rules illustrated in steps 306, 308, and 310.

In some embodiments, each of steps 306, 308, 310, and 312 may be iterated according to the number of atoms in SMALL. Thus, prior to preparing an output for display at step 314, a particular matching step, e.g., 306, 308, 310, and/or 312, may be repeated a number of times equal to the number of atoms in SMALL.

In some embodiments, method 300 may only match according to the first rule whose condition is met and may not backtrack in case of failure, e.g., in case of a similarity of 0. For example, method 300 may not try to find the best matching rule, e.g., the rule that would indicate the highest similarity value, but may end the method once any of the rules indicate a similarity above a threshold value. For example, if after evaluation of the pair of atoms in step 308 according to the prefix rule, the method 300 determines that a similarity threshold is met, then method 300 may prepare the output for display without further continuing to step 310 and beyond.

Alternatively, in some embodiments, method 300 may execute each of steps 306, 308, 310, and 312 before determining whether a pair of strings is similar. In such embodiments, therefore, method 300 may try to find the best matching rule, e.g., the rule that would indicate the highest similarity value, before preparing an output for display at step 314 or going to a trigram algorithm at step 316.

Figure 4:
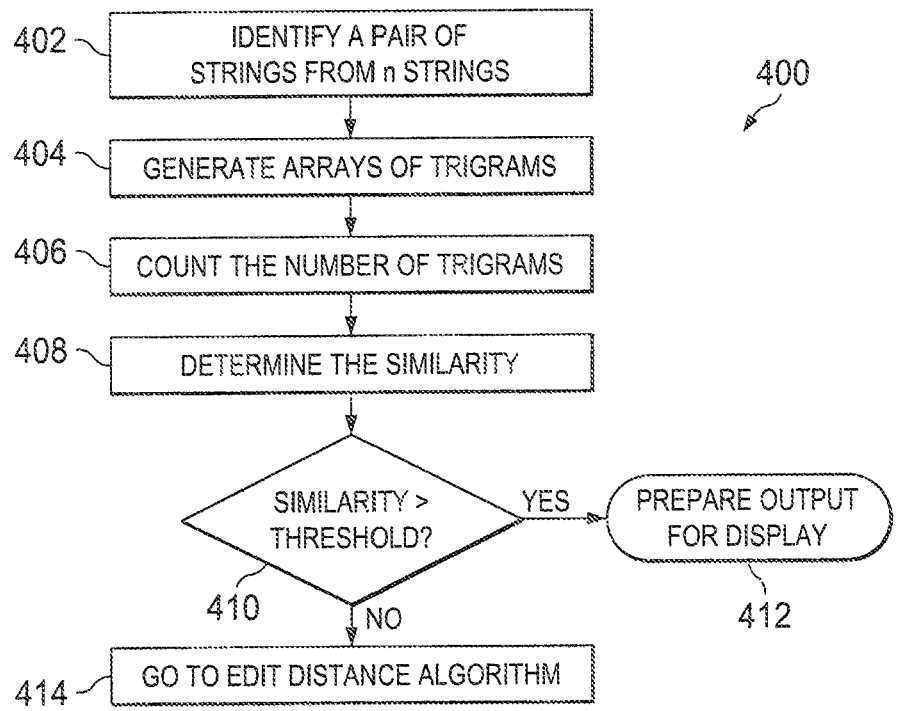
FIG. 4 is a flowchart depicting another example method for matching one or more pairs of strings of characters that can be executed in accordance with embodiments of the present disclosure.

FIG. 4 illustrates a flowchart depicting an example method 400 that can be executed in accordance with embodiments of the present disclosure. In some embodiments, the similarity of character strings can be evaluated using a trigram algorithm implemented in method 400. The method 400 may quickly match moderate and long character strings that are received for analysis 402 and it is also able to detect changes in the order of the words in a character string. For example, a trigram algorithm implemented in method 400 can identify the similarity between two addresses with identical terms in differing orders: "1500, University Avenue, floor 4, room 4.30c" and "University Avenue, 1500, floor 4, room 4.30c ".

In step 402, a pair of strings of a number, n, strings is identified. In step 404, the identified pair of strings are parsed to generate arrays of trigrams, e.g., three letter groupings of characters. For example, the character string "ima aba bamba" can be used to create the following trigrams: '<im' 'ima' 'ma>', '<ab' 'aba' 'ba>' and '<ba' 'bam' 'amb' 'mba' 'ba>'.

In some embodiments, to compute the similarity of two character strings, e.g., T and S, the trigram algorithm 400 converts the two character strings to arrays of trigrams and counts the number of trigrams in the character string T, which are also in the character string S, by counting each trigram pair only once in step 406.

In step 408, the similarity between the pair of strings is determined based on the generated trigrams that are part of T and S. For example, in some embodiments, the similarity of character strings T and S may be equal to the double of number of trigram matches between T and S divided by a total number of trigrams in the two character strings, T and S. In some embodiments, trigram algorithm inputs are sorted trigrams arrays. Assuming sorted input, step 408 can be done in linear time complexity, in a similar manner to merging two sorted arrays. Additionally, in some implementations, the character strings can be sorted only once for performance reasons, e.g., the character strings of a set may be sorted just once instead of multiple times when comparing the same character string against many others.

In step 410, the determined similarity of the pair of character strings is compared to a similarity threshold. If the determined similarity exceeds the set threshold, e.g., a variable threshold, an output is prepared for display in step 412. Otherwise the pair of character strings may be analyzed using another string matching algorithm in step 414, for example edit distance algorithm illustrated in FIG. 5. Alternatively, in some embodiments, method 400 may end after step 410, or may go onto another string matching algorithm, for example.

In some embodiments, the performance of method 400 can be adjusted, e.g., optimized by skipping the comparison if the threshold cannot be met. The highest trigram similarity for two trigram arrays T and S, for which the length of T is smaller or equal to the length of S, may be achieved if for every trigram in T there is a match in S. If the best possible similarity for T and S is below the threshold, the test can be skipped before it starts, e.g., before step 410.

In some embodiments, the performance of method 400 can also be adjusted, e.g., optimized by stopping the comparison in step 410 if enough mismatches were detected such that the threshold cannot be met. For example, the minimum number of trigrams from each trigram array (T and S) for which the trigram algorithm failed to find a match is the guaranteed number of current mismatches. In addition the maximum number of possible mismatches can be found by subtracting from the length of the shortest character string (from T and S) half of the total length of both character strings added, which is multiplied with the threshold. If the number of current mismatches is larger than the number of maximum mismatches, then enough mismatches have been detected such that the threshold cannot be met.

Figure 5:
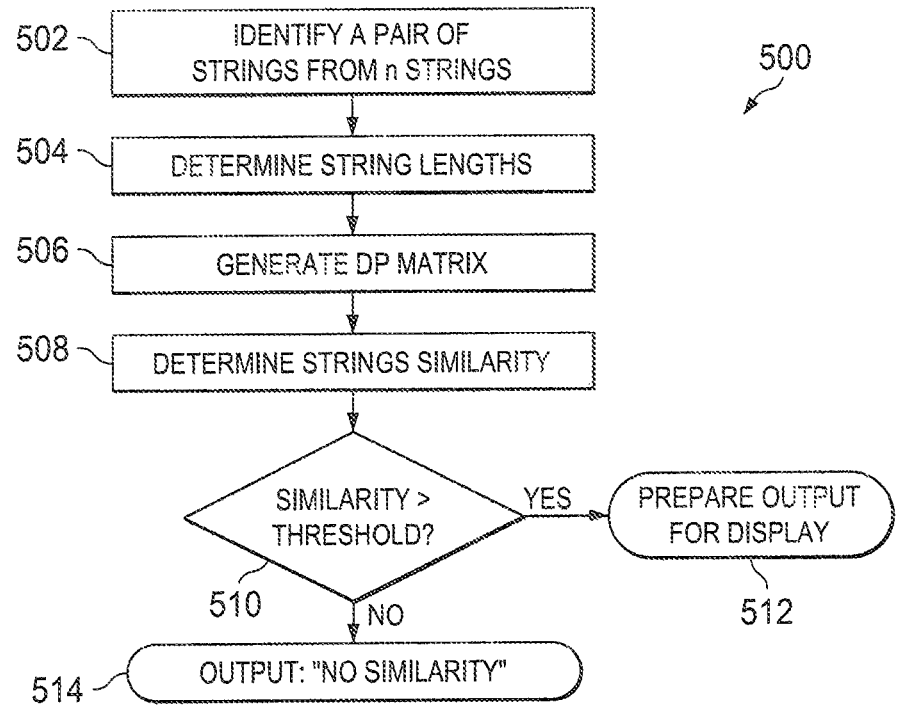
FIG. 5 is a flowchart depicting another example method for matching one or more pairs of strings of characters that can be executed in accordance with embodiments of the present disclosure.

FIG. 5 illustrates a flowchart depicting an example method 500 that can be executed in accordance with embodiments of the present disclosure. In some embodiments, the similarity of character strings can be evaluated using an edit distance algorithm in method 500. The edit distance algorithm can identify the similarity between character strings by, for example, spotting spelling mistakes and format differences, such as "long established" or "long-established", even in short strings.

In step 502, a pair of strings of a number, n, of character strings are identified. In step 504, a string length of each of the pair of character strings is determined. For example, the length of the character string "long established" may be determined to be 15 characters long including a space.

In step 506, a dynamic programming (DP) matrix is generated. In some embodiments, the DP matrix may represent the edit distance between each and every position in the character strings S and T. The edit distance of a pair of character strings, S and T, in some embodiments, may be a minimum number of point mutations required to change S into T, where a point mutation is one of: change a letter, insert a letter, or delete a letter. In some embodiments, a basic dynamic programming algorithm can be used to compute the edit distance. In some embodiments, the edit distance can be computed relying on bit parallelism and encoding the DP matrix (transitions) as bit vectors.

In some embodiments, some properties of the DP matrix can be used to optimize the identification of character string similarity. One property of the DP matrix is that the three transitions allowed according to the DP algorithm (change a letter, insert a letter or delete a letter) do not change nor decrease the value of the next cell along the path. Another property of the DP matrix is that for any two indices i and j of the DP matrix the value of the cell DP[i,j] is larger or equal to the absolute value of the difference between the indices i and j. The cell DP[I,j] contains the edit distance between T[1...j] and S[1...i] and if the length of these two prefixes is different the edit distance must be at least equal to that length.

In some embodiments, using some properties of the DP matrix can be used to avoid computing the entire DP matrix. In some embodiments, the similarity between a pair of character strings is irrelevant unless it is above a certain threshold. To determine if the similarity would exceed a set threshold only a section around the diagonal of the DP Matrix whose size depends on the threshold needs to be computed. For example, if k is the maximum edit distance for which the character strings T and S similarity is above the threshold, when computing the DP matrix (column by column) only the section sized 2k+2 around the main diagonal of the DP matrix has to be computed. Any cell c outside the section sized 2k+2 around the main diagonal has a value greater than k (due to the described properties of DP matrix), therefore for any path through that cell the edit distance will be greater than k. In some embodiments, the value of all the cells in a column C can be used to determine if the similarity would exceed a set threshold. If all the cells of a column C (or the cells of column C, which are around the diagonal) are larger than the minimum edit distance, the computation of the rest of the DP Matrix columns can be stopped because a match cannot be found for character strings T and S.

In step 508, string similarity between the pair of strings is determined based on the DP matrix. In some embodiments, the enumerated conditions may be verified before determining the character strings similarity. In some embodiments, the conditions are not verified and the algorithm generates the entire DP matrix and determines the character strings similarity. According to some embodiments of the edit distance algorithm, a similarity for two character strings T and S, for which the length of T (denoted by $L_T$) is smaller or equal to the length of S, is defined as: $1-(k/L_T)$, where k represents the edit distance between the character string T and S.

In some embodiments if method 500 identifies a character string similarity in step 508, which exceeds a set threshold in step 510, then the output is prepared for display in step 512. In some embodiments, if the method 500 does not identify a similarity between a pair of character strings in step 508 above the threshold, the pair of character strings could be analyzed by another string matching algorithm or if the edit distance algorithm is the last matching algorithm in the set sequence of algorithms several options are available. For example, if a pair of character strings was analyzed by an entire sequence of algorithms (e.g., as illustrated by FIG. 2) and none of them identified a match above the set threshold, a specific output could be prepared for display, e.g., "No similarity identified" in step 514, or the threshold could be automatically decreased and the pair of character strings could be reanalyzed by the sequence of matching algorithms or the system could wait for the client input to either proceed to a new processing step or to end the method.

FIG. 6 illustrates a schematic illustration of an example GUI 600 that can be used to execute embodiments of the present disclosure. In some embodiments a GUI can be used, for example, to receive selections and/or identifications of sources of data including the character strings of interest 602, to confirm the selection of the file 604, to display the character strings and corresponding information 606a, 606b, and 606c, to display another section of the character strings 608, and to initiate the string matching algorithms 610.

In some embodiments, the GUI allows the user to select a data file 602, for example a table containing character strings grouped in three columns. In some embodiments, the GUI will have an upload progress bar and a confirmation of data upload success after the data was uploaded, providing feedback to the user 604. In some embodiments the confirmation of data upload can include the name of the file, the type of the file, the path of the file and/or the date of the most recent update of the file.

In some embodiments, the GUI can reformat all the character strings in the selected file and display them according to the GUI settings. In some embodiments, the GUI can be designed to automatically identify if the character strings are grouped in multiple columns and to preserve the original structure by displaying the organizational information on top 606a and the list of character strings in the corresponding column 606b. The organizational information of the character strings 606a can include a generic name, such as the column number or it can include the title of the character strings group, such as it is provided in the uploaded file.

In some embodiments if the selected list contains a larger number of rows than allocated for display, the GUI will automatically display the selection 606c and it will include a button allowing the user to visualize the following set of rows 608.

In some embodiments, the GUI will include a button to initiate the string matching algorithms 610. In some embodiments, after the character strings are analyzed by the string matching algorithms another GUI can display the results, as illustrated by FIG. 7.

FIG. 7 illustrates a schematic illustration of an example GUI 700 that can be used to execute embodiments of the present disclosure. In some embodiments a GUI can be used to cleanse the data by merging items with similar meanings 702, including a list of analyzed character strings 704 (e.g., column 3 in FIG. 6) and various control buttons 714, 716 and 718.

In some embodiments, for each character string 704a displayed within the character string list 704 the GUI will also provide additional information related to the string matching results 704b. In some embodiments, the additional information related to the string matching results 704b can include the number of character string occurrences, the number of suggestions, the similarity level or other information.

In some embodiments, when the user selects, e.g., by clicking, a character string within the character string list 704, the GUI will automatically display the corresponding suggestions. For example, if the user selects the character string "department of defense" 704a, the GUI will display the two associated suggested character strings: "dept of defense" 706 and "DOD" 708.

In some embodiments the user has to manually identify the preferred character string match. For example, the user can select the character string "department of defense" 704a, and then chose the character string "DOD" 708 by dragging and dropping it in the marked area 710.

In some embodiments, the GUI includes undo and redo buttons 714 to help the user correct a possible mistake performed during the manual identification of the preferred match.

In some embodiments, the GUI contains buttons that allow the user to navigate to other groups of character strings 704c and 704d. For example, the user can click on the button 704c to display the previous group of character strings, e.g., column 2 illustrated in FIG. 6, or the user can click on the button 704d to display the following group of character strings.

In some embodiments, the GUI includes an option for saving the preferred matches (716). For example, the saving option can be provided by an OK or 'save' button. In some embodiments, the preferred matches can be saved automatically at set periods of times.

In some embodiments, the GUI includes an option for canceling the effectuated changes (718). For example, the canceling option can be provided by a "cancel" or "exit" button.

A number of embodiments have been described. Nevertheless, it will be understood that various modifications may be made. For example, other methods described herein besides or in addition to that illustrated in FIGS. 2-5 may be performed. Further, the illustrated steps of methods 200, 300, 400, and 500 may be performed in different orders, either concurrently or serially. Further, steps may be performed in addition to those illustrated in FIGS. 2-5 for string matching and some steps illustrated by FIGS. 2-5 may be omitted without deviating from the present disclosure. Accordingly, other embodiments are within the scope of the following claims.

What is claimed is:

1. A computer-implemented method for comparing character strings, the method comprising:
    identifying a first character string having a first string length, and a second character string having a second string length greater than the first string length;
    parsing the first character string into one or more first sub-groups of characters;
    parsing the second character string into one or more second sub-groups of characters;
    comparing each of the one or more first sub-groups of characters against the one or more second sub-groups of characters;
    determining a ratio of a number of characters in the one or more first sub-groups of characters that match the one or more second sub-groups of characters and the second string length;
    based on the ratio being less than a threshold, that comprises a variable value based on the first string length:
        parsing the first character string into one or more first groups of trigrams, each of the first groups of trigrams comprising three characters of the first character string;
        parsing the second character string into one or more second groups of trigrams, each of the second groups of trigrams comprising three characters of the second character string;

determining a number of trigram matches between the one or more first groups of trigrams and the one or more second groups of trigrams;

determining a second ratio of the number of trigram matches and a sum of the first and second groups of trigrams; and based on either of the first or second ratios being greater or equal to the threshold, preparing at least one of the first or second character strings for display.

2. The method of claim 1, further comprising based on the ratio being less than the threshold, matching the first character string to at least a first sub-group of the one or more second sub-groups of characters of the second character string; and based on a ratio of first string length and the second string length that is greater or equal to the threshold, preparing at least one of the first or second character strings for display.

3. The method of claim 1, further comprising based on the ratio being less than the threshold, matching a first sub-group of the first character string with a first sub-group of the second character string;

matching a last sub-group of the first character string with a last sub-group of the second character string; and based on a ratio of a combined length of the first and last sub-groups of the first character string and the second string length that is greater or equal to the threshold, preparing at least one of the first or second character strings for display.

4. The method of claim 1, further comprising based on the ratio being less than the threshold, determining that the characters of the first character string match first characters of at least a subset of the one or more second sub-groups of characters;

determining a number of matched characters being equal to a sum of a number of characters in the subset of the one or more second sub-groups of characters;

determining a number of unmatched characters being equal to the second string length minus the number of matched characters; and based on a ratio of the number of matched characters and the number of unmatched characters that is greater or equal to the threshold, preparing at least one of the first or second character strings for display.

5. The method of claim 1, further comprising, based on the ratio of the number of trigram matches and a sum of the first and second groups of trigrams being less than the threshold, determining an edit distance value between the first character string and the second character string, the edit distance comprising a number of edits to the first character string so that the first character string matches the second character string;

determining a similarity of the first and second character strings based on a ratio of the edit distance of the first string distance; and based on the similarity being greater or equal to the threshold, preparing at least one of the first or second character strings for display.

6. The method of claim 1, further comprising:

determining the variable value based on the first string length, a upper limit of the threshold, a lower limit of the threshold, and a growth rate of the threshold .

7. The method of claim 6, wherein determining the variable value comprises:

determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and determining the variable value based on a value equal to 1 minus a ratio of the complement and the first string length.

8. A non-transitory computer storage medium encoded with a computer program, the program comprising instructions that when executed by one or more computers cause the one or more computers to perform operations comprising:

identifying a first character string having a first string length, and a second character string having a second string length greater than the first string length;

parsing the first character string into one or more first sub-groups of characters;

parsing the second character string into one or more second sub-groups of characters;

comparing each of the one or more first sub-groups of characters against the one or more second sub-groups of characters;

determining a ratio of a number of characters in the one or more first sub-groups of characters that match the one or more second sub-groups of characters and the second string length;

based on the ratio being less than a threshold, that comprises a variable value based on the first string length:

parsing the first character string into one or more first groups of trigrams, each of the first groups of trigrams comprising three characters of the first character string;

parsing the second character string into one or more second groups of trigrams, each of the second groups of trigrams comprising three characters of the second character string;

determining a number of trigram matches between the one or more first groups of trigrams and the one or more second groups of trigrams;

determining a second ratio of the number of trigram matches and a sum of the first and second groups of trigrams; and based on either of the first or second ratios greater or equal to the threshold, preparing at least one of the first or second character strings for display.

9. The non-transitory computer storage medium of claim 8, wherein the operations further comprise, based on the ratio being less than the threshold, matching the first character string to at least a first sub-group of the one or more second sub-groups of characters of the second character string; and based on a ratio of first string length and the second string length that is greater or equal to the threshold, preparing at least one of the first or second character strings for display.

10. The non-transitory computer storage medium of claim 8, wherein the operations further comprise, based on the ratio being less than the threshold, matching a first sub-group of the first character string with a first sub-group of the second character string;

matching a last sub-group of the first character string with a last sub-group of the second character string; and based on a ratio of a combined length of the first and last sub-groups of the first character string and the second string length that is greater or equal to the threshold, preparing at least one of the first or second character strings for display.

11. The non-transitory computer storage medium of claim 8, wherein the operations further comprise, based on the ratio being less than the threshold, determining that the characters of the first character string match first characters of at least a subset of the one or more second sub-groups of characters;

determining a number of matched characters being equal to a sum of a number of characters in the subset of the one or more second sub-groups of characters;

determining a number of unmatched characters being equal to the second string length minus the number of matched characters; and based on a ratio of the number of matched characters and the number of unmatched characters that is greater or equal to the threshold, preparing at least one of the first or second character strings for display.

12. The non-transitory computer storage medium of claim 1, wherein the operations further comprise, based on the ratio of the number of trigram matches and a sum of the first and second groups of trigrams being less than the threshold, determining an edit distance value between the first character string and the second character string, the edit distance comprising a number of edits to the first character string so that the first character string matches the second character string;

determining a similarity of the first and second character strings based on a ratio of the edit distance of the first string distance; and based on the similarity being greater or equal to the threshold, preparing at least one of the first or second character strings for display.

13. The non-transitory computer storage medium of claim 8, wherein the operations further comprise:

determining the variable value based on the first string length, a upper limit of the threshold, a lower limit of the threshold, and a growth rate of the threshold.

14. The non-transitory computer storage medium of claim 13, wherein determining the variable value comprises:

determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and determining the variable value based on a value equal to 1 minus a ratio of the complement and the first string length.

15. A system of one or more computers configured to perform operations comprising:

identifying a first character string having a first string length, and a second character string having a second string length greater than the first string length;

parsing the first character string into one or more first sub-groups of characters;

parsing the second character string into one or more second sub-groups of characters;

comparing each of the one or more first sub-groups of characters against the one or more second sub-groups of characters;

determining a ratio of a number of characters in the one or more first sub-groups of characters that match the one or more second sub-groups of characters and the second string length;

based on the ratio being less than a threshold, that comprises a variable value based on the first string length:

parsing the first character string into one or more first groups of trigrams, each of the first groups of trigrams comprising three characters of the first character string;

parsing the second character string into one or more second groups of trigrams, each of the second groups of trigrams comprising three characters of the second character string;

determining a number of trigram matches between the one or more first groups of trigrams and the one or more second groups of trigrams;

determining a second ratio of the number of trigram matches and a sum of the first and second groups of trigrams; and based on either of the first or second ratios greater or equal to the threshold, preparing at least one of the first or second character strings for display.

16. The system of claim 15, wherein the operations further comprise, based on the ratio being less than the threshold, matching the first character string to at least a first sub-group of the one or more second sub-groups of characters of the second character string; and based on a ratio of first string length and the second string length that is greater or equal to the threshold, preparing at least one of the first or second character strings for display.

17. The system of claim 15, wherein the operations further comprise, based on the ratio being less than the threshold, matching a first sub-group of the first character string with a first sub-group of the second character string;

matching a last sub-group of the first character string with a last sub-group of the second character string; and based on a ratio of a combined length of the first and last sub-groups of the first character string and the second string length that is greater or equal to the threshold, preparing at least one of the first or second character strings for display.

18. The system of claim 15, wherein the operations further comprise, based on the ratio being less than the threshold, determining that the characters of the first character string match first characters of at least a subset of the one or more second sub-groups of characters;

determining a number of matched characters being equal to a sum of a number of characters in the subset of the one or more second sub-groups of characters;

determining a number of unmatched characters being equal to the second string length minus the number of matched characters; and based on a ratio of the number of matched characters and the number of unmatched characters that is greater or equal to the threshold, preparing at least one of the first or second character strings for display.

19. The system of claim 15, wherein the operations further comprise, based on the ratio of the number of trigram matches and a sum of the first and second groups of trigrams being less than the threshold, determining an edit distance value between the first character string and the second character string, the edit distance comprising a number of edits to the first character string so that the first character string matches the second character string;

determining a similarity of the first and second character strings based on a ratio of the edit distance of the first string distance; and based on the similarity being greater or equal to the threshold, preparing at least one of the first or second character strings for display.

20. The system of claim 15, wherein the operations further comprise:

determining the variable value based on the first string length, a upper limit of the threshold, a lower limit of the threshold, and a growth rate of the threshold.

21. The system of claim 20, wherein determining the variable value comprises:

determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and determining the variable value based on a value equal to 1 minus a ratio of the complement and the first string length.

22. A computer-implemented method for comparing character strings, the method comprising:
- identifying a first character string having a first string length, and a second character string having a second string length greater than the first string length;
- parsing the first character string into one or more first sub-groups of characters;
- parsing the second character string into one or more second sub-groups of characters;
- comparing each of the one or more first sub-groups of characters against the one or more second sub-groups of characters;
- determining a ratio of a number of characters in the one or more first sub-groups of characters that match the one or more second sub-groups of characters and the second string length; and
- based on the ratio being less than a threshold, preparing at least one of the first or second character strings for display, the threshold comprising a variable value based on the first string length, the variable value determined based on the first string length, an upper limit of the threshold, a lower limit of the threshold, and a growth rate of the threshold, the determination comprising:
  - determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and
  - determining the variable value based on a value equal to 1 minus a ratio of the complement and the first string length.

23. A non-transitory computer storage medium encoded with a computer program, the program comprising instructions that when executed by one or more computers cause the one or more computers to perform operations comprising:
- identifying a first character string having a first string length, and a second character string having a second string length greater than the first string length;
- parsing the first character string into one or more first sub-groups of characters;
- parsing the second character string into one or more second sub-groups of characters;
- comparing each of the one or more first sub-groups of characters against the one or more second sub-groups of characters;
- determining a ratio of a number of characters in the one or more first sub-groups of characters that match the one or more second sub-groups of characters and the second string length; and
- based on the ratio being less than a threshold, preparing at least one of the first or second character strings for display, the threshold comprising a variable value based on the first string length, the variable value determined based on the first string length, an upper limit of the threshold, a lower limit of the threshold, and a growth rate of the threshold, the determination comprising:
  - determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and
  - determining the variable value based on a value equal to 1 minus a ratio of the complement and the first string length.

24. A system of one or more computers configured to perform operations comprising:
- identifying a first character string having a first string length, and a second character string having a second string length greater than the first string length;
- parsing the first character string into one or more first sub-groups of characters;
- parsing the second character string into one or more second sub-groups of characters;
- comparing each of the one or more first sub-groups of characters against the one or more second sub-groups of characters;
- determining a ratio of a number of characters in the one or more first sub-groups of characters that match the one or more second sub-groups of characters and the second string length; and
- based on the ratio being less than a threshold, preparing at least one of the first or second character strings for display, the threshold comprising a variable value based on the first string length, the variable value determined based on the first string length, an upper limit of the threshold, a lower limit of the threshold, and a growth rate of the threshold, the determination comprising:
  - determining a complement of the threshold that is equal to a sum of (a) a value that equals the first string length multiplied by a function that equals 1 minus the upper limit of the threshold, and (b) a value that equals a log of a ratio of the first string length and the growth rate of the threshold; and
  - determining the variable value based on a value equal to 1 minus a ratio of the complement and the first string length.

\* \* \* \* \*